US006237814B1

(12) United States Patent
Blyler et al.

(10) Patent No.: US 6,237,814 B1
(45) Date of Patent: May 29, 2001

(54) RELATING TO DISPENSING APPARATUS

(75) Inventors: Wayne Blyler; Andrew Wright, both of King's Lynn (GB)

(73) Assignee: Bespak plc (GB)

( * ) Notice: Subject to any disclaimer, the term of this patent is extended or adjusted under 35 U.S.C. 154(b) by 0 days.

(21) Appl. No.: 09/457,998

(22) Filed: Dec. 10, 1999

(30) Foreign Application Priority Data

Dec. 15, 1998 (GB) .................................................. 9827609

(51) Int. Cl.7 ............................... B67D 5/58; G01F 11/06

(52) U.S. Cl. .................................... 222/189.09; 222/321.9

(58) Field of Search ............................. 222/189.09, 321.9

(56) References Cited

U.S. PATENT DOCUMENTS

| | | | | |
|---|---|---|---|---|
| 3,756,472 | * | 9/1973 | Vos | 222/189 |
| 4,694,976 | | 9/1987 | Schuetz | 222/189 |
| 4,960,230 | * | 10/1990 | Marelli | 222/321 |
| 5,025,957 | * | 6/1991 | Ranalletta et al. | 222/189 |
| 5,154,325 | * | 10/1992 | Ryder et al. | 222/189 |
| 5,320,254 | | 6/1994 | Ranalletta et al. | 222/189 |
| 5,727,715 | | 3/1998 | McKenna et al. | 222/189.09 |
| 5,772,078 | * | 6/1998 | Knickerbocker | 222/321.1 |

FOREIGN PATENT DOCUMENTS

| | | |
|---|---|---|
| 0487412 | 11/1991 | (EP) . |
| 0800869 | 3/1997 | (EP) . |
| WO 97/18902 | 5/1997 | (WO) . |
| WO 98/48943 | 11/1998 | (WO) . |

* cited by examiner

*Primary Examiner*—Joseph A. Kaufman
*Assistant Examiner*—Patrick Buechner
(74) *Attorney, Agent, or Firm*—Smith, Gambrell & Russell, LLP

(57) ABSTRACT

The present invention relates to a dispensing apparatus for use in dispensing fluid products in an aerosol form. The invention provides a pump (2) mounted on a container for storage of the product. The pump comprises a pump body (3) defining a metering chamber (7), an inlet (25) within the container and a stem (4) for discharging product from the metering chamber and recharging it. Ventilating structures are provided communicating between an exterior of the apparatus and an interior of the container. The ventilating structures comprising a filter (40) through which ambient air passes, wherein the filter is annular and comprises an axially extending sleeve portion (41) conformal with an internal surface of the pump body.

10 Claims, 1 Drawing Sheet

RELATING TO DISPENSING APPARATUS

BACKGROUND OF THE INVENTION

The present invention relates to dispensing apparatus for use in dispensing fluid products in an aerosol form.

Such a dispensing apparatus typically comprises a dispensing unit engagingly sealed to an upper end of a storage container in which product to be dispensed is held. In order to maintain consistent operation of the dispensing apparatus, as the contents of the storage container are dispensed to an atmosphere during actuation of the apparatus, an air vent is provided to allow air to enter the container in order to equalise the pressures inside and outside the storage container.

A problem with ventilating the container in this manner lies in the potential contamination of the product by contaminants in the ambient air which are drawn into the container. This is a particular problem where the product to be dispensed is a pharmaceutical product, a product with perishable ingredients or a product liable to microbial contamination.

EP 0 487 412 A1 discloses one solution to this problem. The ventilating means in this apparatus comprises a disc-like annular filter covering a vent opening in a sheath such that ambient air entering the storage container passes through the filter. A problem with the device of EP 0 487 412 A1 is that a different size of filter is required for each type and size of dispensing apparatus that is manufactured. A further problem lies in that the transverse arrangement of the filter across the sheath means that the apparatus is not suitable for use with all storage containers, especially those having narrow openings at their upper ends. A yet further problem with disc-like filters subsists in the difficulty of assembling them with the remainder of the apparatus. Such filters tend to be difficult to handle, especially by automated machines, and easily separated from the remainder of the apparatus.

OBJECT OF THE INVENTION

It is therefore an object of the present invention to provide a dispensing apparatus having vent means for ventilating the storage container wherein the vent means includes a filter which is suitable for use in all shapes and sizes of storage containers.

It is a further object of the present invention to provide a dispensing apparatus having filter means for filtering vented air which is suitable for use with storage containers of all sizes including containers with narrow apertures.

SUMMARY OF THE INVENTION

Accordingly, the present invention provides a dispensing apparatus for dispensing a fluid product comprising a pump mounted on a container for storage of the product, the pump comprising a pump body defining a metering chamber, an inlet within the container, and an actuator for discharging product from the metering chamber and recharging it, and ventilating means communicating between an exterior of the apparatus and an interior of the container, ventilating means comprising a filter through which ambient air passes, wherein the filter is annular and comprises an axially extending sleeve portion conformal with an internal surface of the pump body.

DETAILED DESCRIPTION OF THE INVENTION

Figure 1:
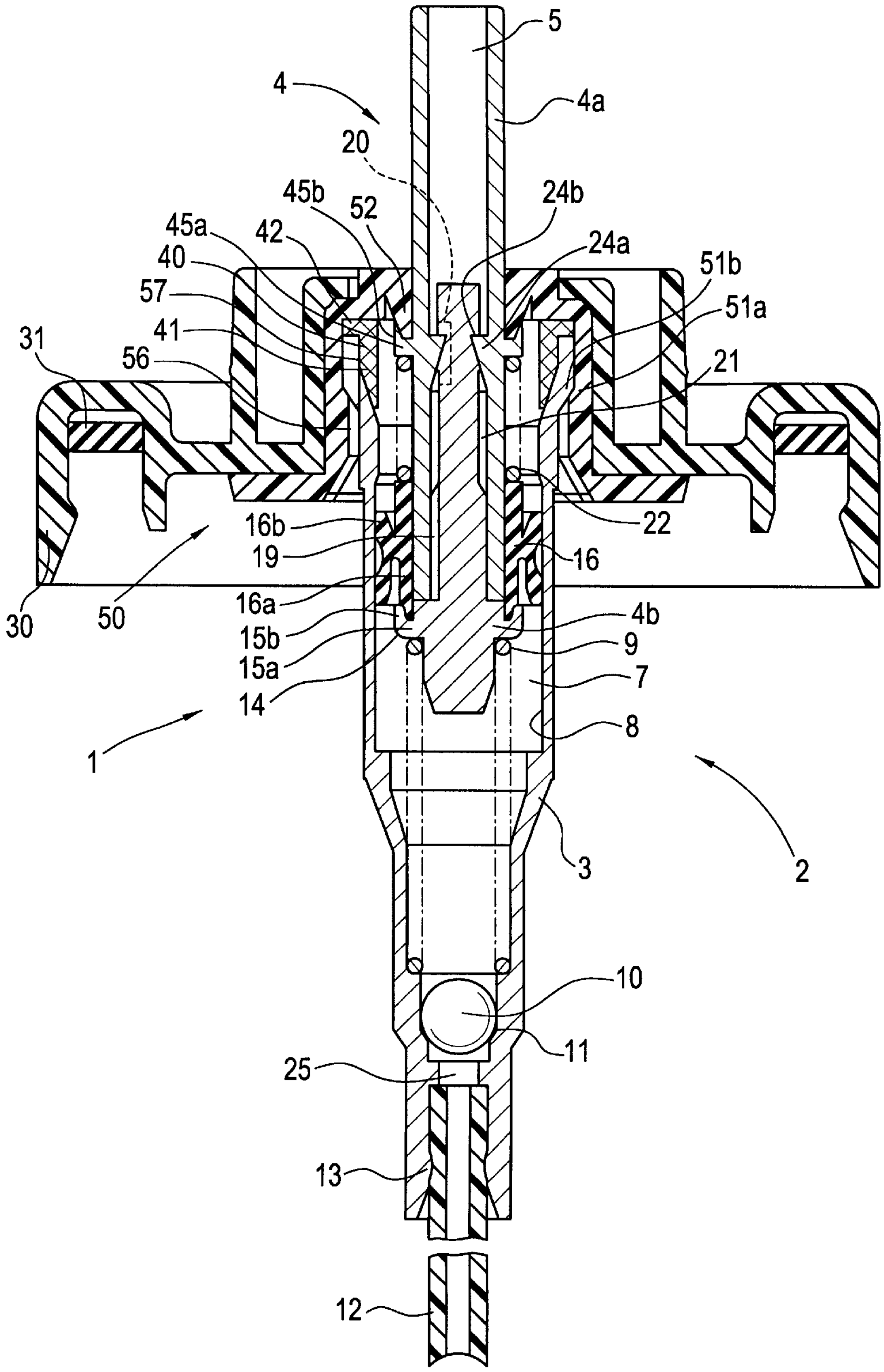
FIG. 1—shows a cross-sectional view of a dispensing apparatus according to the present invention.

An embodiment of the present invention will now be described, by way of example only, with reference to FIG. 1 which shows a cross-sectional side elevation of a dispensing apparatus according to the present invention. In the following description the terms "downwards", "downwardly", "upwards" and "upwardly" refer to movement of components of the apparatus when oriented as shown in FIG. 1. If the apparatus is oriented in a different direction, these terms should be construed accordingly. In addition, the terms "lower" and "upper" denote relative positioning of parts of the apparatus when oriented as shown in FIG. 1. Again, if the apparatus is oriented in a different direction, these terms should be construed accordingly. The term "fluid" is used generally to denote either the liquid or gaseous phase.

FIG. 1 shows one embodiment of dispensing apparatus according to the present invention. The dispensing apparatus 1 comprises a pump, generally designated by reference 2, mounted on a storage container (not shown) by means of a closure 30 which covers the mouth of the container. The closure 30 has a central substantially cylindrical bore in which is located a collar 50 for positioning the pump relative to the closure 30. A small ridge may be provided on the inner surface of the bore to hold the collar 50 in position. An upper end of a pump body 3 of the pump 2 extends into and is retainingly engaged within the collar 50 by means of cooperating formations 51*a* and 51*b*.

The closure 30 may be of plastics material and be designed to be a push-fit over an upper rim of the storage container. The closure 30 may alternatively be a ferrule of deformable metal which is crimped to the upper rim of the container. A gasket 31 of generally annular form is provided within the closure 30 against which the upper rim of the storage container is firmly held to create a fluid tight seal therebetween. The collar 50 is preferably also of a plastics material.

The pump 2 comprises, as mentioned above, an elongate pump body 3. The pump body 3 defines a metering chamber 7. At a "lower" end of the pump body 3 remote from the closure 30 is an inlet passage 25 which communicates with the metering chamber 7. An inlet valve 10, 11 is provided to open and close the inlet passage 25 during use. The inlet valve 10, 11 may, for example, comprise a spherical ball 10 which is movable into and out of sealing contact with a valve seat 11. Connected to the inlet passage 25 is a dip-tube 12 which extends downwardly into the product contained within the storage container. An end of the dip-tube 12 is retained in the pump body 3 by suitable means, such as a detent formation 13.

The pump 2 further comprises a stem 4, which is provided in coaxial alignment with the pump body 3. The stem 4 has a substantially hollow upper part 4*a*, which extends from within the pump body 3 so as to protrude out of an uppermost end of the pump body 3 and defines an outlet duct 5. The stem 4 also has a substantially solid lower part 4*b*. A portion of the lower stem part 4*b* is located co-axially within the lower end of the upper stem part 4*a* and is rigidly held in position by means of cooperating formations 24*a* and 24*b*. The principal external diameter of that portion of the lower stem part 4*b* located within the upper stem part 4*a* is less than the internal diameter of the portion of the upper stem part 4*a* in which it is located, such that a passage 21 is defined therebetween. The passage 21 communicates with the outlet duct 5 by means of an indented channel 20 in an upper end of the lower stem part 4*b* which spans the join formed by the cooperating formations 24*a* and 24*b*. Radially extending ribs 19 extend from the external surface of the lower stem part 4*b* to contact the internal surface of the upper stem part 4*a* in order to prevent relative lateral movement of the upper and lower stem parts 4*a* and 4*b*.

A sliding seal 16 is disposed around an outer surface of the stem 4. The seal 16 comprises an annular sleeve portion 16*a* in face to face contact with the stem 4 and flexible extensions 16*b* which extend from the sleeve portion 16*a* radially outwardly into contact with an inner surface 8 of the pump body 3. The length of the extensions 16*b* is such that they form a fluid tight seal with the pump body 3 even during sliding movement of the seal 16 relative to the pump body 3. The seal 16 provides the means for centering the stems 4 within the tubular pump body 3.

The stem 4 is also supported in position by the collar 50, although it does not seal thereagainst. A ventilating flow path is provided between the inner surface of the collar 50 and the stem 4, and between the inner surface of an upper end of the pump body 3 and the stem 4.

Apertures 57 are provided at an upper end of the pump body 3 to allow fluid communication between the interior of the pump body 3 and the storage container via one or more gaps 56 between the external surface of the pump body 3 and the internal surface of the collar 50. The ventilating path therefore extends from the interior of the storage container to atmosphere via gap(s) 56, apertures 57 and the clearance between the upper part 4*a* of the stem 4 and collar 50.

Valve means are provided for controlling the opening and closing of the ventilating portion in the following manner:

the upper stem part 4*a* has a radially extending flange 45*a* part way along its length. A distal edge of the flange includes a transverse, upwardly projecting rim 45*b*. The collar 50 is provided with an inwardly extending annular extension 52. In an inoperative position of the apparatus, as shown in FIG. 1, the extension 52 engages with, and forms a fluid tight seal with the flange 45*a* of the upper stem part 4*a*. The seal is broken during operation of the apparatus, as described below. Together the extension 52 and flange 45*a* thus form a valve means for controlling opening and closing of the ventilating path linking the contents of the storage container with atmosphere.

Further valve means are provided for controlling the product flow path from the metering chamber to the passage 21 inside the stem 4 in the following manner:

the lower stem part 4*b* is also provided with a radially extending flange 15*a* with an upwardly turned rim 15*b*. A first spring 9 extends between a lower edge 14 of flange 15*a* and a lower part of the pump body 3, to bias the upper and lower stem parts 4*a* and 4*b* in an upwardly direction wherein the ventilating path is closed by valve means 45*a*, 52. In this inoperative position a lower end of the annular sleeve portion 16*a* of the sliding seal 16 engages with, and forms a fluid tight seal with the flange 15*a*. Together, therefore, the sleeve portion 16*a* and flange 15*a* form a valve means for controlling opening and closing of the outlet from the metering chamber. A second spring 22 extends between an upper end of the sliding seal 16 and a lower edge of the flange 15*a* on the upper stem part 4*a* to bias the sliding seal 16 in a downward direction so that the metering chamber outlet valve means is closed.

A filter 40 is incorporated in the dispensing apparatus 1 so as to cover apertures 57. The filter 40 preferably comprises an annular insert having a sleeve portion 41 and a radial flange 42. The filter 40 is positioned in the pump body 3 during assembly of the pump 2 so that the sleeve portion 41 lies within an upper end of the pump body 3 and covers the apertures 57. The flange 42 is of similar external diameter to that of the upper end of the pump body 3. When fully inserted into the pump body 3 the dependant flange abuts against the upper edge of the pump body 3. The filter 40 is firmly held in place within the assembled apparatus 1 between the upper edge of the pump body 3 and the collar 50. The external size and shape of the sleeve portion 41 of the filter is such that the filter 40 forms a "push-fit" with the pump body 3 and an effective seal between the filter 40 and pump body 3 is achieved. Thus any air drawn into the storage container passes along the ventilating path and passes through the filter 40 where harmful and unwanted microbial contaminants are removed from the air.

An advantage of the present filter is that the filter 40 may be inserted into the pump body 3 before final assembly of the pump 2. The pump assembly may then be handled and moved without risk of the filter 40 and pump body 3 separating. This makes overall assembly of the apparatus 1 more straightforward and quicker. The pump assembly is also more suitable for use with automated assembly machinery than conventional "disc-like" filters which are prone to falling out of their seats.

The filter 40 may be made from any suitable material, such as plastics or paper. However, the filter has been found to be particularly efficient when manufactured from ultra high molecular weight polyethylene (UMHW-PE). The UMHW-PE is preferably formed by sintering. The UMHW-PE may be formed to have an average pore size of between 7 and 40 microns.

Operation of the dispensing apparatus will now be described, starting from the inoperative position shown in FIG. 1 with the metering chamber 7 charged with product.

A user of the apparatus depresses the stem 4 by means of an actuator button (not shown) causing the stem 4 to move downwardly. A compressive force is thereby applied to the contents of the metering chamber 7. At the same time, as the flange 45*a* moves downwardly, the ventilating path valve means 45*a*, 52 open. Since the inlet valve means 10, 11 and outlet valve means 15*b*, 16*a* are closed and the contents of the metering chamber 7 are virtually incompressible, further downward movement of the stem 4 causes the sliding seal 16 to move relative to the upper part 4*a* and lower part 4*b* of the stem 4 to accommodate movement of the product within the metering chamber 7. The movement of the sliding seal 16 opens the outlet valve means 15*b*, 16*a*. At this point, the now pressurised contents of the metering chamber 7 are dispensed to atmosphere via the outlet valve means 15*b*, 16*a*, passage 21, indented channel 20 and outlet duct 5. As the contents of the metering chamber 7 are discharged, the pressure therein decreases and the sliding seal 16 moves back downwardly relative to the upper part 4*a* and lower part 4*b* of the stem 4 under the biasing force of the second spring 22 to close the outlet valve 15*b*, 16*a*.

When the user releases the stem 4, it returns upwardly towards the inoperative position of FIG. 1 under the biasing force of first spring 9. This results in a reduction of pressure within the metering chamber 7 causing product to be drawn up through dip-tube 12 via inlet passage 25 to unseat ball 10 from valve seat 11 to open the inlet valve means 10, 11 and re-charge the metering chamber 7. At the same time, reduction of pressure within the storage container due to removal of a quantity of product therefrom causes ambient air to be drawn into the storage container via the clearance between the stem upper part 4*a* and the collar 50, ventilating path valve means 45*a*, 52 and clearance 56.

What is claimed is:

1. A dispensing apparatus, for dispensing a fluid product, comprising:

a pump mounted on a container for storage of the product, the pump comprising a pump body defining a metering chamber, an inlet within the container, and a stem for discharging product from the metering chamber and recharging it, and ventilating means communicating between an exterior of the apparatus and an interior of the container, the ventilating means communicating between an exterior of the apparatus and an interior of the container, the ventilating means comprising a filter through which ambient air passes, wherein the filter is annular and comprises a flange portion and an axially extending sleeve portion conformal with an internal surface of the pump body.

2. The dispensing apparatus as claimed in claim 1, wherein the ventilating means include at least one aperture in the pump body and the filter is located such that it fully covers the at least one aperture.

3. The dispensing apparatus as claimed in claim 1, further comprising a closure for retaining the dispensing unit on the container, wherein on assembly of the apparatus, the filter flange is retained between the closure and the pump body.

4. The dispensing apparatus as claimed in claim 3, wherein a separate collar is located within an annular bore of the closure, and the flange of the filter is retained in the assembled apparatus between the collar and the pump body.

5. The dispensing apparatus as claimed in claim 1, wherein the filter is ultra high molecular weight polyethylene.

6. The dispensing apparatus as claimed in claim 5, wherein the ultra high molecular weight polyethylene has an average pore size of between 7 and 40 microns.

7. The dispensing apparatus as claimed in claim 5, wherein the filter is sintered ultra high molecular weight polyethylene.

8. The dispensing apparatus as claimed in claim 1, further comprising valve means for controlling passage of air through the ventilating means.

9. The dispensing apparatus as claimed in claim 8, further comprising a closure for retaining the dispensing unit on the container, wherein the valve means comprises sealingly engageable projections on the stem and closure.

10. The dispensing apparatus as claimed in claim 9, wherein a separate collar is located within an annular bore of the closure and the projection on the stem comprises a radially extending flange having a transverse upwardly projecting rim, and the projection on the closure comprises an inwardly extending annular extension of the collar.

* * * * *